(12) United States Patent
DeMan et al.

(10) Patent No.: US 8,971,599 B2
(45) Date of Patent: Mar. 3, 2015

(54) TOMOGRAPHIC ITERATIVE RECONSTRUCTION

(75) Inventors: Bruno Kristiaan Bernard DeMan, Clifton Park, NY (US); Thomas Matthew Benson, Clifton Park, NY (US); Lin Fu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 973 days.

(21) Appl. No.: 12/973,649

(22) Filed: Dec. 20, 2010

(65) Prior Publication Data

US 2012/0155728 A1 Jun. 21, 2012

(51) Int. Cl.
*G06K 9/00* (2006.01)
*G06T 11/00* (2006.01)

(52) U.S. Cl.
CPC ......... *G06T 11/006* (2013.01); *G06T 2211/424* (2013.01)
USPC ............................................. 382/128; 378/4

(58) Field of Classification Search
CPC .................. G06T 2211/424; G06T 2211/421; G06T 2211/428; G06T 11/005; G06T 11/006; G06T 2211/40
USPC ................ 382/100, 128–134, 154, 255, 260; 128/920, 922; 600/407, 410–416, 600/420–425, 427, 434–435, 437, 101, 109, 600/112, 114, 117–118, 139, 145, 173, 562, 600/587; 434/262, 263; 250/363.04, 363.1, 250/370.11; 700/57, 245; 703/2, 6, 11; 606/1, 45, 130, 159; 378/4–27, 65, 95, 378/98, 108, 98.11, 98.12
See application file for complete search history.

(56) References Cited

U.S. PATENT DOCUMENTS

| | | | |
|---|---|---|---|
| 6,097,784 A | 8/2000 | Tuy | |
| 6,342,699 B1 | 1/2002 | Jeanguillaume | |
| 6,768,782 B1 * | 7/2004 | Hsieh et al. ....................... | 378/8 |
| 7,139,420 B2 * | 11/2006 | Kalifa et al. .................. | 382/133 |
| 7,394,927 B2 * | 7/2008 | Proksa et al. ................. | 382/154 |
| 7,409,033 B2 | 8/2008 | Zhu et al. | |
| 7,444,010 B2 * | 10/2008 | De Man ......................... | 382/131 |
| 7,492,967 B2 * | 2/2009 | Toki et al. ..................... | 382/299 |
| 7,756,240 B2 | 7/2010 | Nishide et al. | |
| 7,902,511 B2 * | 3/2011 | Thielemans et al. ...... | 250/363.04 |
| 8,135,186 B2 * | 3/2012 | Bouman et al. ............... | 382/128 |
| 8,442,353 B2 * | 5/2013 | Miao et al. .................... | 382/280 |
| 2006/0102846 A1 * | 5/2006 | Manjeshwar et al. ... | 250/363.03 |
| 2006/0182327 A1 * | 8/2006 | Mundy et al. ................. | 382/132 |
| 2006/0285730 A1 * | 12/2006 | Habets et al. ................. | 382/128 |

(Continued)

OTHER PUBLICATIONS

Snyder, Donald L., et al.; "The use of sieves to stabilize images produced with the EM algorithm for emission tomography", IEEE Transactions on Nuclear Science, vol. NS-32, No. 5, Oct. 1985, pp. 3864-3872.

(Continued)

*Primary Examiner* — Hadi Akhavannik
(74) *Attorney, Agent, or Firm* — Fletcher Yoder, P.C.

(57) ABSTRACT

The present disclosure relates to iterative reconstruction of images. In certain embodiments, a deconvolution filter is used to approximate the inversion of a Hessian matrix associated with the reconstruction. In one such embodiment, the desired image is not reconstructed directly in the iterative process. Instead, an image is reconstructed that yields the desired image when filtered by the deconvolution filter.

21 Claims, 6 Drawing Sheets

(56) References Cited

U.S. PATENT DOCUMENTS

| | | | |
|---|---|---|---|
| 2007/0140407 A1* | 6/2007 | Chen et al. | 378/4 |
| 2008/0118020 A1* | 5/2008 | Thibault et al. | 378/4 |
| 2009/0202125 A1* | 8/2009 | Zhao et al. | 382/131 |
| 2010/0246918 A1* | 9/2010 | Kappler et al. | 382/131 |
| 2010/0284596 A1* | 11/2010 | Miao et al. | 382/131 |
| 2011/0097007 A1* | 4/2011 | Zeng et al. | 382/260 |
| 2011/0164799 A1* | 7/2011 | Miao et al. | 382/131 |
| 2011/0293159 A1* | 12/2011 | Bruder et al. | 382/131 |
| 2013/0031153 A1* | 1/2013 | Bates | 708/524 |

OTHER PUBLICATIONS

Tanaka, Eiichi; "A fast reconstruction algorithm for stationary positron emission tomography based on a modified EM algorithm", IEEE Transactions on Medical Imaging, vol. MI-6, No. 2, Jun. 1987, pp. 98-105.

Clinthorne, Neal H., et al.; "Preconditioning methods for improved convergence rates in iterative reconstructions", IEEE Transactions on Medical Imaging, vol. 12, No. 1, Mar. 1993, pp. 78-83.

Nuyts, Johan, et al.; "Acceleration of maximum likelihood reconstruction, using frequency amplification and attenuation compensation", IEEE Transactions on Medical Imaging, vol. 12, No. 4, Dec. 1993, pp. 643-652.

Lalush, David S., et al.; "Improving the convergence of iterative filtered backprojection algorithms", American Association of Phys. Med. 21 (8), Aug. 1994, pp. 1283-1286.

Hudson, H. Malcolm, et al.; "Accelerated image reconstruction using ordered subsets of projection data", IEEE Transactions on Medical Imaging, vol. 13, No. 4, Dec. 1994, pp. 601-609.

De Pierro, Alvaro R.; "A modified expectation maximization algorithm for penalized likelihood estimation in emission tomography", IEEE Transactions on Medical Imaging, vol. 14, No. 1, Mar. 1995, pp. 132-137.

Fessler, Jeffrey A., et al.; "Grouped-coordinate ascent algorithms for penalized-likelihood transmission image reconstruction", IEEE Transactions on Medical Imaging, vol. 16, No. 2, Apr. 1997, pp. 166-175.

Fessler, Jeffrey A., et al.; "Conjugate-gradient preconditioning methods for shift-variant PET image reconstruction", IEEE Transactions on Image Processing, vol. 8, No. 5, May 1999, pp. 688-699.

Zeng, Gengsheng L., et al.; "Unmatched projector/backprojector pairs in an iterative reconstruction algorithm", IEEE Transactions on Medical Imaging, vol. 19, No., May 2000, pp. 548-555.

Katsevich, Alexander; "An improved exact filtered backprojection algorithm for spiral computed tomography", Advances in Applied Mathematics 32, 2004, pp. 681-697.

Ahn, Sangtae, et al.; "Convergent incremental optimization transfer algorithms: application to tomography", IEEE Transactions on Medical Imaging, vol. 25, No. 3, Mar. 2006, pp. 283-296.

Thibault, Jean-Baptiste, et al.; "A three-dimensional statistical approach to improved image quality for multislice helical CT", Med. Phys. 34 (11), Nov. 2007, pp. 4526-4544.

Sunnegardh, Johan; "Iterative filtered backprojection methods for helical cone-beam CT", Linkoping Studies in Science and Technology Dissertation No. 1264, Aug. 2009, 108 pgs.

* cited by examiner

TOMOGRAPHIC ITERATIVE RECONSTRUCTION

BACKGROUND OF THE INVENTION

The present disclosure is directed generally to the reconstruction of tomographic images and, more specifically, to approaches for reconstructing tomographic images using iterative reconstruction.

Non-invasive imaging technologies allow images of the internal structures of a patient or object to be obtained without performing an invasive procedure on the patient or object. In particular, technologies such as computed tomography (CT), magnetic resonance imaging (MRI), positron emission tomography (PET), and single positron emission computed tomography (SPECT) use various physical principles to acquire image data and to construct tomographic images (e.g., three-dimensional representations of the interior of the human body or of other imaged structures).

The reconstruction of tomographic images may be a laborious and time-consuming process. For example, certain reconstruction processes attempt to utilize an approach where the image reconstruction processes are iterated until some degree of convergence based on some image quality criteria is achieved. Certain of these iterative reconstruction approaches utilize simultaneous update methods that are suitable for parallel implementation or processing. However, these types of iterative approaches may also be subject to slow convergence speed for various high frequency image features. Further, such iterative approaches may be very processor-intensive, requiring large amounts of processor power to implement effectively.

BRIEF DESCRIPTION OF THE INVENTION

In one embodiment, an iterative image reconstruction method is provided. The method includes the steps of generating an image, generating a set of calculated measurements based on the image, and generating a set of actual measurements. A determination is made whether a completion criterion is satisfied. If the completion criterion is satisfied, the image is provided as a final image. If the completion criterion is not satisfied: an image update of the image is generated, a deconvolution filter or a square root of the deconvolution filter is applied to one or both of the image or the image update, and the steps of generating the set of calculated measurements and determining whether the completion criterion is satisfied is repeated.

In a further embodiment, an iterative reconstruction method is provided. In accordance with this method a first image is iteratively reconstructed. The first image, when filtered using a deconvolution filter, corresponds to a current estimate of a second image that represents a scanned object. The deconvolution filter is applied during each iteration of the iterative reconstruction.

In another embodiment, an image processing system is provided. The image processing system includes a processing component configured to implement one or more algorithms. The one or more algorithms, when implemented by the processing component: iteratively reconstruct a sequence of images, wherein a deconvolution filter is applied during each iteration of the iterative reconstruction; and terminate the iterative reconstruction upon satisfaction of a completion criterion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The present approach is directed to the use of iterative reconstruction for tomographic data sets. In particular, certain embodiments are directed to the use of model-based iterative reconstruction approaches that perform simultaneous updates. In certain implementations, an image domain deconvolution filter, such as a ramp filter or other deconvolution filter, is employed to achieve faster convergence in the iterative process. In other implementations, the deconvolution filter may be applied in the projection or other non-image domain. Thus, instead of reconstructing the final image directly, an image (i.e, a pre-image) is reconstructed which, after application of a ramp filter or other deconvolution filter, provides the final image. In certain embodiments, the deconvolution filter may be applied in combination with statistical weight modeling and/or image regularization (i.e., use of a prior).

The approaches disclosed herein are suitable for use with a wide range of tomographic reconstruction systems, such as, but not limited to, computed tomography (CT), magnetic resonance imaging (MRI), positron emission tomography (PET), and single positron emission computed tomography (SPECT). To facilitate explanation, the present disclosure will primarily discuss the present iterative reconstruction approaches in the context of a CT system. However, it should be understood that the following discussion is equally applicable to other tomographic reconstruction systems, such as those listed above as well as others.

Figure 1:
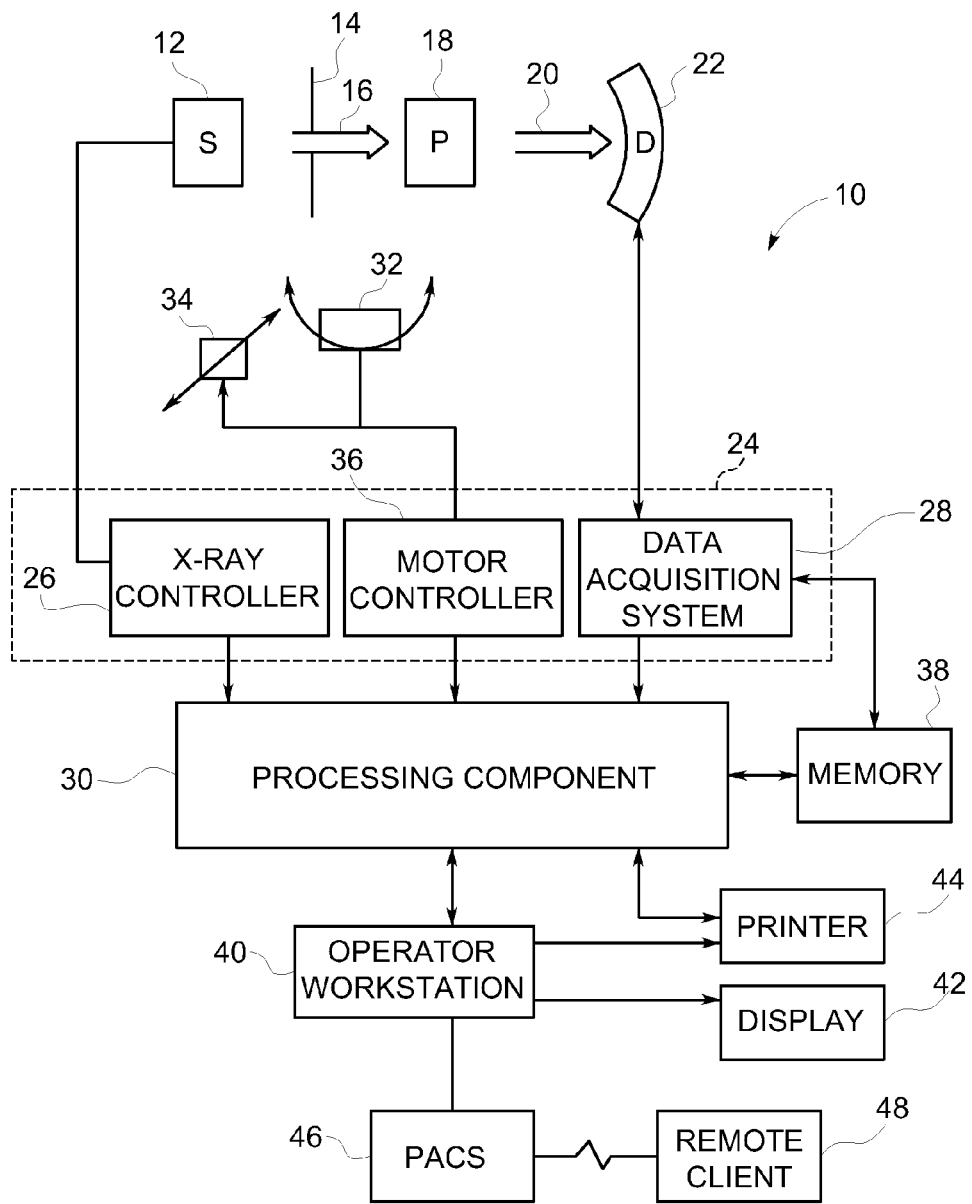
FIG. 1 is a diagrammatical view of a CT imaging system for use in producing images in accordance with aspects of the present disclosure.

With this in mind, an example of a computer tomography (CT) imaging system 10 designed to acquire X-ray attenuation data at a variety of views around a patient and suitable for tomographic reconstruction is provided in FIG. 1. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. A portion of the X-ray radiation 20 passes through or around the patient 18 and impacts a detector array, represented generally at reference numeral 22. Detector elements of the array produce electrical signals that represent the intensity of the incident X-rays 20.

These signals are acquired and processed to reconstruct images of the features within the patient 18.

Source 12 is controlled by a system controller 24, which furnishes both power, and control signals for CT examination sequences. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18. It should be noted that the rotational subsystem 32 might include a gantry upon which the respective X-ray emission and detection components are disposed. Thus, in such an embodiment, the system controller 24 may be utilized to operate the gantry. The linear positioning subsystem 34 may enable the patient 18, or more specifically a table supporting the patient, to be displaced within the bore of the CT system 10. Thus, the table may be linearly moved within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at a variety of views relative to the subject. In the present context, system controller 24 may also includes signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for iterative image reconstruction described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

With the foregoing example of one suitable image acquisition system in mind, the reconstruction of image data generated using such a tomographic imaging system is discussed. For example, a tomographic scanner such as system 10 may measure a dataset y that is a function of the object or image dataset x through a system operator A. In the simplest case this is a linear model and can be written as a matrix multiplication:

$$y = A * x \tag{1}$$

This equation gets more complicated when including exponential attenuation, spatial-dependent blurring, polychromaticity, and so forth. However, in all cases there is a notion of a system matrix A with elements $a_{ij}$, which relate an individual measurement $y_i$ to an individual image voxel $x_j$. In different imaging modalitites, the property corresponding to x may vary. For example, x can be the activity in PET or SPECT, the attenuation coefficient or material density in CT, or any other quantity to be tomographically reconstructed. Correspondingly, y is typically a detector signal, representing a detected energy, a number of photons, or an electric current. Thus, x is typically the property being tomographically reconstructed, y is typically the detector signal or measurement at the detector and the element $a_{ij}$ of matrix A provides the necessary transformation to get from one detector value $y_i$ to a particular voxel $x_j$.

The most direct approach to reconstruct x from y is to use an analytic inversion approach. In the simplest case, this may be represented as:

$$x = \hat{A}^{-1} * y \quad (2)$$

where $\hat{A}$ is an estimate of A, and $\hat{A}^{-1}$ is an analytically computed inverse of $\hat{A}$, such as a filtered backprojection (FBP).

The main alternative to the analytic inversion process described above is to use iterative inversion or iterative reconstruction. In such an iterative approach, for every iteration a current estimate of the image x (or a subset of it) is run through a forward model including $\hat{A}$, resulting in an estimated dataset $\hat{y}$ (or a subset of it). The estimated data set $\hat{y}$ is compared with the measured dataset y, and the image x is updated based on the residual discrepancy. In some cases the discrepancy between y and $\hat{y}$ is weighted (implicitly or explicitly) based on the estimated statistical reliability of a measurement i. Approaches where a weighting is used based on some estimate of the statistical reliability of the measurements may be described as statistical iterative reconstruction approaches.

One example of a statistical iterative reconstruction is an ordered subsets expectation maximization (OSEM) approach, which is an implicitly-weighted statistical iterative reconstruction algorithm that may be used in emission tomography. In an OSEM algorithm, the entire image is updated every iteration based on a subset of the measurements. Another example, of a statistical iterative reconstruction is an iterative coordinate descent (ICD) approach, which is an explicitly-weighted statistical iterative reconstruction algorithm usually targetted at transmission tomography. In an ICD reconstruction, one pixel of the image is updated every iteration based on all the measurements. While the examples and embodiments discussed herein are generally presented in the context of statistical iterative reconstruction, it should be appreciated that the approaches disclosed herein are suitable for other, non-statistical, iterative reconstruction approaches. One example of a non-statistical iterative reconstruction algorithm is the algebraic reconstruction technique (ART). In an ART reconstruction, all pixels are updated every iteration based on one single measurement.

These various approaches have different strengths and weaknesses. For example, single-coordinate approaches like ICD update one pixel at the time, resulting in fast convergence of the high frequencies (i.e., few iterations), but each iteration is slow. Conversely, simultaneous update approaches like OSEM update all pixels at the same time, resulting in slow convergence (i.e., many iterations), but each iteration is relatively fast.

Various approaches may be employed to improve the efficiency of the update step in iterative reconstruction approaches that employ simultaneous updates. For example, algebraically, it may be desirable to use a Newton Raphson step to compute an efficient update step:

$$x^{n+1} = x^n + H^{-1} * \nabla$$

where $\nabla$ is the easy-to-compute gradient and H is the Hessian matrix (i.e., matrix of second derivatives). However, the size of the Hessian matrix is typically about 1 million×1 million in two-dimensional reconstructions, and its size can be orders of magnitude greater in three-dimensional cases. Therefore, it is typically not feasible to directly invert the Hessian matrix. Further, approaches that approximate or simplify this algebraic approach typically result in poor convergence (i.e., many iterations).

With the foregoing in mind, the present approach attempts to optimize a statistical cost function (such as a weighted least squares, point weighted least squares, maximum likelihood, maximum a posteriori probability, or other cost function) efficiently without inverting or directly manipulating the Hessian matrix. In particular, in one embodiment a change of variables is implemented. For example, in one implementation, instead of reconstructing x directly, an image z is instead reconstructed which, when filtered, provides x. In one such embodiment the filter employed is a deconvolution filter F, such as a ramp filter or other high pass filters, such that:

$$\hat{y} = A * F * z \quad (4)$$

or $$\hat{y} = B * z \quad (5)$$

In two-dimensional reconstruction the deconvolution filter can be provided as a two-dimensional filter kernel while in three-dimensional reconstruction the deconvolution filter can be provided as a three-dimensional filter kernel. In one implementation, the two-dimensional or three-dimensional filter kernels consist of a large positive central element while the remaining elements (i.e., the surrounding or peripheral elements) consist of small negative or small positive values, like a ramp filter. The filter has the effect of a deconvolution and by incorporating the filter in the reconstruction, neighboring pixel values are decoupled, thereby accelerating reconstruction. In one embodiment, the deconvolution filter is implemented as a ramp filter operation in the image domain using fast Fourier transform (FFT) operations.

In certain embodiments the image z may be initially estimated using a simple backprojection. In other embodiments, the image z may be provided by a filtered backprojection reconstruction (FBP). In such an embodiment, the reconstruction used as the image z may or may not be smoothed. In one embodiment in which an iterative three-dimensional cone-beam CT reconstruction is performed, a three dimensional filtered backprojection (such as a backprojection employing Katsevich's filter) may be employed.

Typically iterative processing continues until a specified completion criterion is met which signifies that no additional iterations are to be performed. In certain embodiments, the completion criterion may be a predetermined number of iterations, such as an empirically determined number of iterations corresponding to a desired degree of image enhancement. In other embodiments, the completion criterion may generally reflect the degree of convergence attained between the calculated and measured images or image characteristics. That is, the completion criterion may be based upon a desired degree of convergence between the calculated and measured images or image characteristics such that the degree of similarity is deemed sufficient and/or such that further iterations will not further converge the calculated and measured images or image characteristics to an appreciable or desired extent. In certain implementations, the completion criterion may be implemented as a cost function, such as a statistically weighted cost function C, that may be optimized to assess convergence (and, thus, to determine when the iterative processing is complete) such that:

$$C(\hat{y}(x)) \equiv C(\hat{y}(z)). \quad (6)$$

A prior or regularizer can be defined as in other iterative reconstruction approaches, either in the x-domain or in the z-domain. Upon optimization of the cost function (generally signifying little or no image improvement would be attained by additional iterations) convergence is achieved and image z may be converted to image space by application of the appropriate filter:

$$x = F^*z. \quad (7)$$

The change of variables as discussed herein does not change the final image x, but instead makes the update step almost perfectly separable from the remainder of the reconstruction process. That is, the unknowns (e.g., image pixel values) are decoupled, allowing simultaneous update algorithms to converge more quickly. Since every image can be written as the convolution of an image and filter (e.g., a ramp filter), the present approach does not pose any limitation on the reconstructed images.

With the foregoing general discussion and examples in mind, various specific implementations are discussed below to further illustrate the present approach. In one example, the above-described change of variable approach is implemented in the context of a gradient descent algorithm. In this example, in the original image space x, the image update equation can be written as:

$$x^{(n+1)} = x^{(n)} + \alpha A^T w(y - Ax^{(n)}). \quad (8)$$

After changing variable from x to z, the image update equation becomes $$z^{(n+1)} = z^{(n)} + \alpha F^T A^T w(y - AFz^{(n)}). \quad (9)$$

where F is a suitable deconvolution filter, such as a ramp filter, or the square root of a ramp filter. When effective convergence is reached, we may convert z to the image space by computing x=F*z, as disclosed with respect to equation (7) above.

Figure 2:
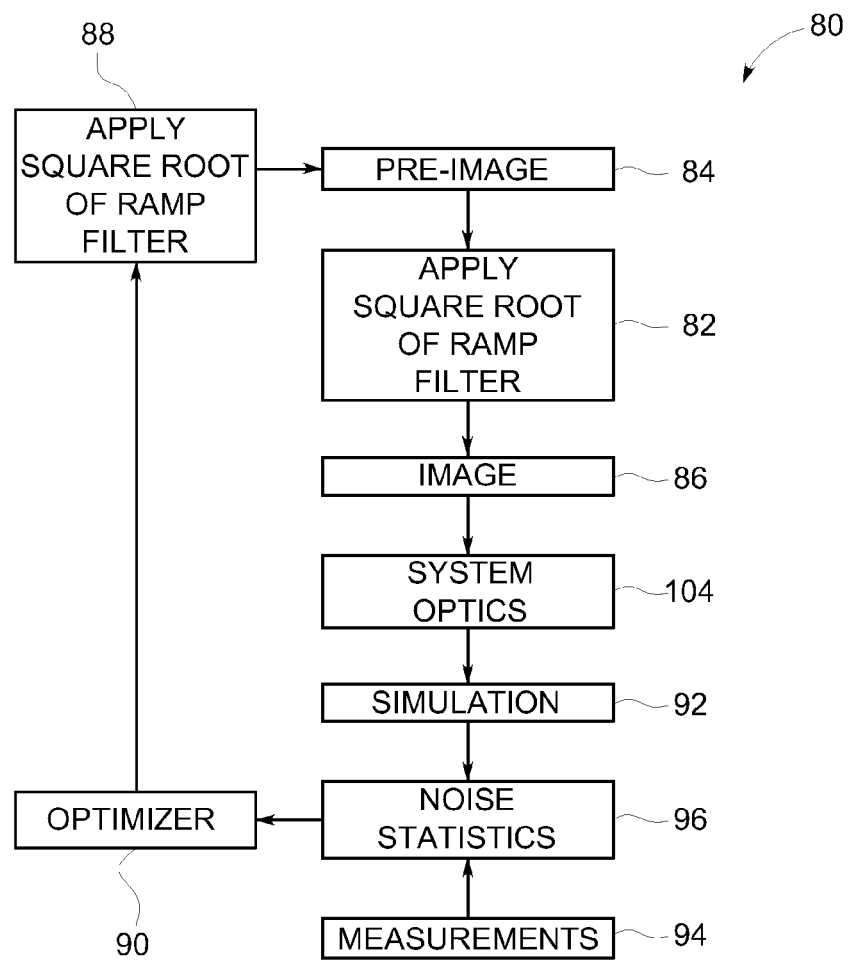
FIG. 2 depicts a flow chart describing steps of an algorithm for implementing aspects of the present disclosure.

For example, turning to FIG. 2, flowchart 80 depicts steps associated with one implementation in which the square root of the ramp filter is applied at different points in the image reconstruction process. In the depicted example, the square root of the ramp filter is initially applied (block 82) to a pre-image 84 (e.g., an image which when ramp-filtered, gives the actual image) to generate image 86. In addition, the square root of the ramp filter is applied (block 88) to the image update generated by the optimization process 90 used to update the pre-image 84 as the iterative process proceeds.

Based upon the noise statistics (e.g., the differences between the measured and calculated sinograms) a cost function may be evaluated to evaluate the degree of difference between the simulation 92 and the measurements 94 to determine whether additional iterations will be applied. In one embodiment a suitable cost function used to assess convergence may be a quadratically penalized weighted least squares (WLS) cost function, such as:

$$C(x) = \tfrac{1}{2}\|y - Ax\|_D^2 + \tfrac{1}{2}\beta x^T R x \quad (10)$$

where D is the statistical weighting, and β is the regularization strength. In general, the relevant completion criteria may be based on a projection domain comparison, a suitable cost function, image domain statistics, a MAP cost function, or iteration number, or any other suitable convergence indication to determine algorithm termination.

If no additional iterations are needed, the image 86 is determined to be the final image. Otherwise, an image update is generated by the optimizer 90 based on the noise statistics 96. In certain embodiments, the optimizer 90 may be a formula or algorithm implemented on a processor or other computing component to update the image 86. The updated image may be ramp filtered to approximate inversion of the Hessian matrix and to generate an updated image for processing in the next iteration. As noted above, other suitable deconvolution filters (such as high pass filters) may be applied in other embodiments. In certain embodiments the ramp filter (or other deconvolution filter) is applied in the image domain. However, in other embodiments the ramp filter (or other deconvolution filter) is applied in the projection domain (or other non-image domain, depending on the imaging modality).

In yet other embodiments, the ramp filter (or other deconvolution filter) may be applied at different times or in different forms. For example, both sides of Equation (9) can be multiplied by filter F (e.g., a ramp filter or other deconvolution filter) to obtain:

$$Fz^{(n+1)} = Fz^{(n)} + \alpha FF^T A^T w(y - AFz^{(n)}) \quad (11)$$

which can be re-written as $$x^{(n+1)} = x^{(n)} + \alpha FF^T A^T w(y - Ax^{(n)}). \quad (12)$$

In this implementations, the iteration is now in the original image space. To implement equation (12), an image domain filter $FF^T$ may be applied to the image increment $\alpha A^T w(y - Ax^{(n)})$. As discussed above, to approximate the inverse of the Hessian matrix, F may be implemented as the square root of a ramp filter, i.e., $FF^T$ becomes a standard ramp filter. Including a prior term in equation (12) gives $$x^{(n+1)} = x^{(n)} + \alpha FF^T [A^T w(y - Ax^{(n)}) - \beta \nabla R(X^{(n)})] \quad (13)$$

where ∇R is the gradient of the prior cost function and β is a regularization parameter.

Figure 3:
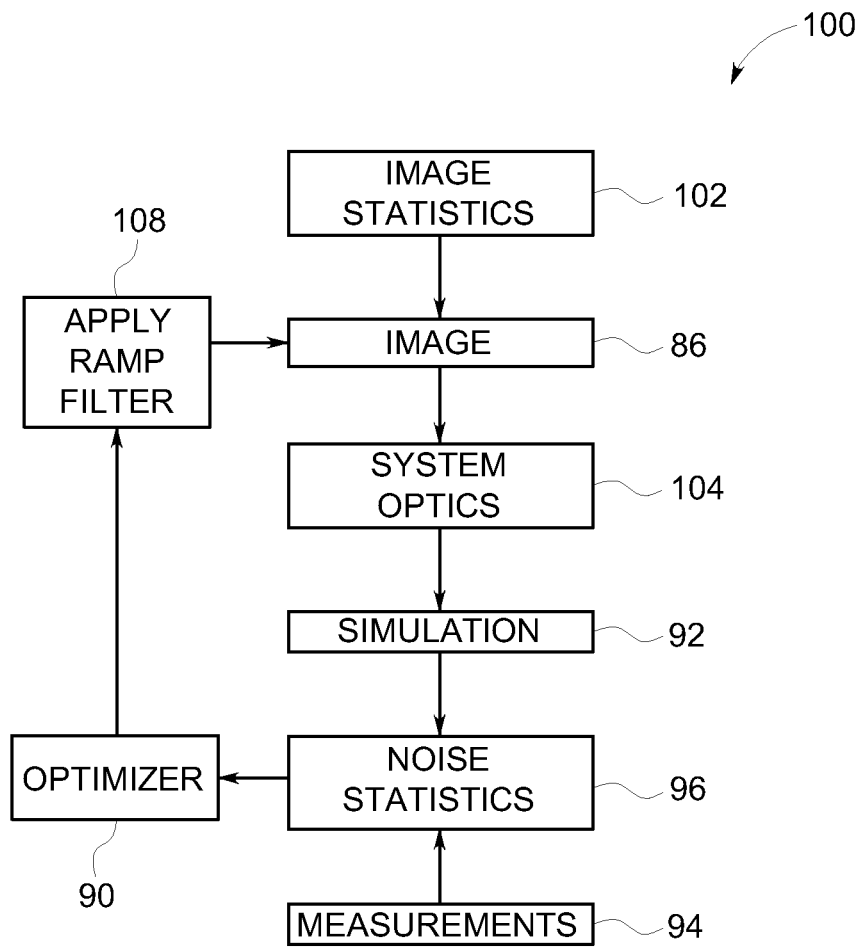
FIG. 3 depicts a flow chart describing steps of an algorithm for implementing further aspects of the present disclosure.

With the foregoing in mind, FIG. 3 provides a flow chart depicting one example of an implementation of the present approach in which a ramp filter is employed as part of a model-based iterative reconstruction process 100. In accordance with this example, an image 86 may be derived based on image statistics 102 (e.g., an image prior or regularizer) determined for the image reconstruction. The image 86 may be processed based upon the system optics 104 (e.g., a forward model determined for the corresponding imaging system) to derive a simulation 92 (e.g., a calculated sinogram). Noise statistics 96 (e.g., differences or residual values) may be derived based upon the simulation (e.g., the calculated sinogram) and a set of measurements 94 (e.g., a measured sinogram). Based upon the noise statistics (e.g., the differences between the measured and calculated sinograms) a cost function may be evaluated to determine whether additional iterations will be applied. If no additional iterations are needed, the image 86 is determined to be the final image. Otherwise, an image update is generated by the optimizer 90 based on the noise statistics 96. In certain embodiments, the optimizer 90 may be a formula or algorithm implemented on a processor or other computing component to update the image 86. The updated image may be ramp filtered (block 108) to approximate inversion of the Hessian matrix and to generate an updated image for processing in the next iteration. Other suitable deconvolution filters (such as high pass filters) may be applied in other embodiments. In certain embodiments the ramp filter (or other deconvolution filter) is applied in the image domain. However, in other embodiments the ramp filter (or other deconvolution filter) is applied in the projection domain (or other non-image domain, depending on the imaging modality).

With the flowchart 80 of FIG. 3 in mind, in one embodiment a gradient descent approach may be employed for minimization, in accordance with:

$$\hat{x}^{(n+1)} = \hat{x}^{(n)} - \alpha(A^TD(A\hat{x}^{(n)} - y) + \beta\nabla R\hat{x}^{(n)}) \quad (14)$$

where β is the regularization strength. In one such implementation, adding a positive-definite deconvolution filter (preconditioner) results in:

$$\hat{x}^{(n+1)} = \hat{x}^{(n)} - \alpha M(A^TD(A\hat{x}^{(n)} - y) + \beta\nabla R\hat{x}^{(n)}) \quad (15)$$

where M is a positive-definite deconvolution filter. In one implementation:

$$M = (A^TDA + \beta R)^{-1}. \quad (16)$$

Further, as discussed herein, the Hessian matrix may be approximated, such as with a spatially-weighted ramp filter, where:

$$(A^TDA + \beta R)^{-1} \approx (A^TDA)^{-1} \approx (\wedge A^TA \wedge)^{-1} \approx \wedge^{-1}[\text{ramp filter}]\wedge^{-1} \quad (17)$$

and where:

$$\wedge = \text{diag}\{\kappa_j\}, \text{ and} \quad (18)$$

$$\kappa_j = \sqrt{\sum_i A_{ij}^2 D_{ii} \bigg/ \sum_i A_{ij}^2}. \quad (19)$$

Figure 4:
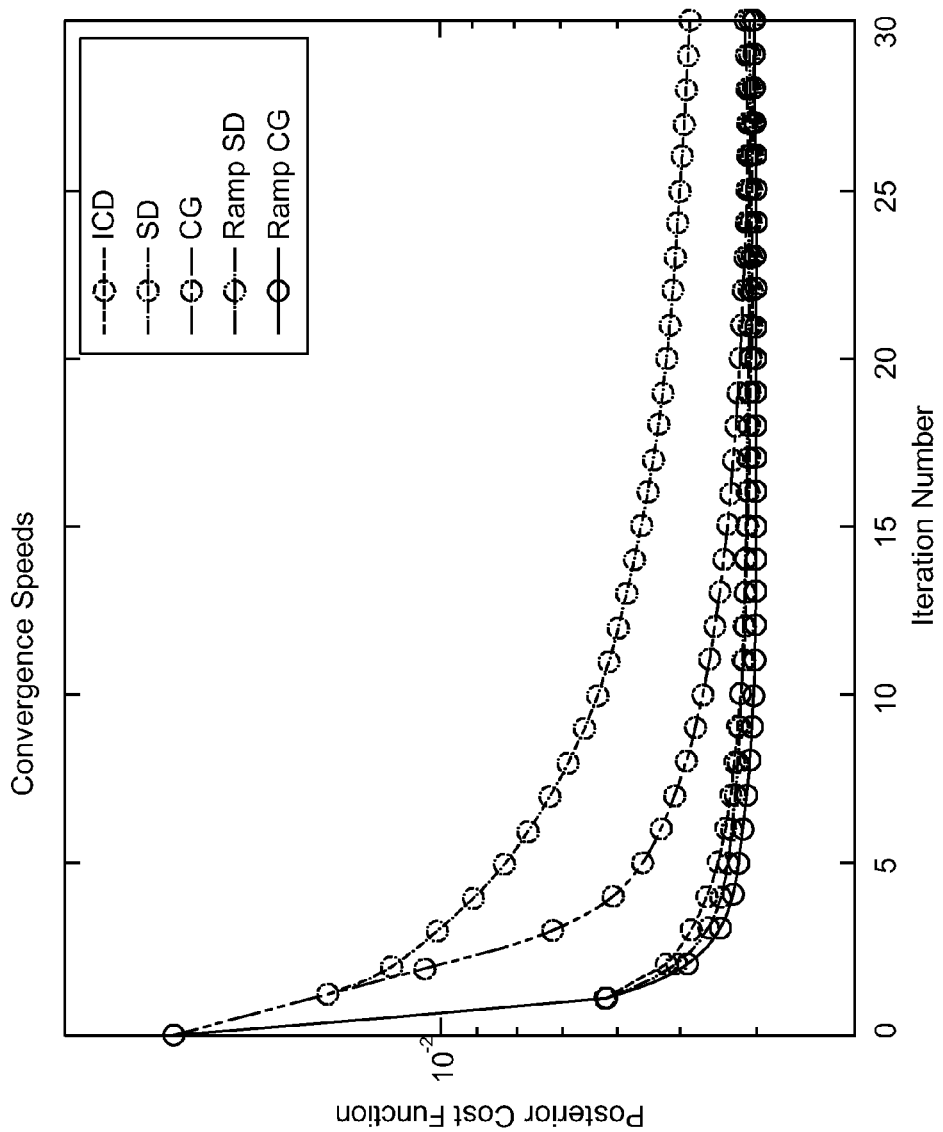
FIG. 4 depicts a graph displaying convergence speeds obtained using deconvolution filtering during iterative reconstruction in accordance with aspects of the present disclosure.

Such a ramp-filtered model-based iterative reconstruction may be used to accelerate convergence by approximating the Hessian matrix using a deconvolution filter. In one example of an implementation, a pixelized Shepp-Logan phantom (64× 64) was imaged to generate a 64×64 two-dimensional image. A system matrix A was computed and a noiseless projection computed by a forward projection using the system matrix. Gaussian noise was added with a diagonal covariance matrix $D^{-1}$. A q-generalized Gaussian Markov random field (qG-GMRF) regularization term was employed as the prior and penalized differences between eight neighboring pixels in two-dimension. The regularization strength β was chosen manually. The image data was iteratively reconstructed using five different approaches: iterative coordinate descent (ICD), steepest descent (SD), conjugate gradient (CG), and SD and CG implementations employing ramp-filter approximation of the Hessian gradient, as discussed herein. A filtered backprojection image was employed as the initial image in each reconstruction. The ICD reconstruction employed random update order with the non-negativity constraint disabled. The CG reconstruction was of the Polak-Ribiere form. Results of these reconstructions are depicted in FIG. 4. As depicted in FIG. 4, the ramp filter based approaches converge more quickly than the non-ramp filter based counter-parts, and with a similar number of iterations as the ICD reconstruction, which only updates a single pixel each iteration as opposed to the other reconstruction approaches which perform simultaneous pixel updates each iteration.

To further improve convergence speeds, other iterative optimization techniques (such as line search, conjugate gradient, ordered subsets, Nesterov optimization, and so forth) can be combined with filter operation to provide further acceleration. For example, Nesterov optimal gradient iteration may be performed in certain embodiments in conjunction with application of a deconvolution filter. For example, in conventional gradient descent for L2-error minimization may be performed in accordance with:

$$x^{n+1} = x^n + \tau A^T(y - Ax^n) \quad (20)$$

However, in implementations in which Nesterov optimization is employed, the Nesterov optimal gradient for L2-error minimization uses two prior iterations to generate the next solution update in accordance with:

$$x^{n+1} = g^n + \tau A^T(y - Ag^n) \quad (21)$$

where:

$$g^n = x^n + \frac{n-1}{n+2}(x^n - x^{n-1}) \quad (22)$$

In certain implementations (such as iterative CT reconstruction) it may be useful to utilize edge-preserving priors to recover sharp boundaries and maintain image resolution. However, because edge-preserving priors are space-variant, a ramp filter may not be a suitable approximation to the inverse of the Hessian matrix. In such implementations, the ramp filter may be applied to the data fit term alone, leaving the prior term unfiltered:

$$x^{(n+1)} = x^{(n)} + \alpha FF^T[A^Tw(y - Ax^{(n)})] - \beta\nabla R(x^{(n)}). \quad (23)$$

That is, in such embodiments, the filtered likelihood term and the unfiltered prior term are combined to provide edge preservation.

In a further embodiment, it is recognized that one theoretical constraint is that the image domain ramp filter has infinite support, which would require reconstruction of an image with infinite support. To obviate this possible constraint in implementations where it might arise, the order of ramp filter application and backprojection may be switched such that the ramp-filter is implemented in the projection domain:

$$x^{(n+1)} = x^{(n)} + \alpha\{[A^Tfw(y - Ax^{(n)})] - \beta\nabla R(x^{(n)})\} \quad (24)$$

where f is a projection domain ramp filter. In one such embodiment, rebinning of projection data (e.g., cone-to-parallel) can be performed so that projection domain filtering is more accurate.

Figure 5:
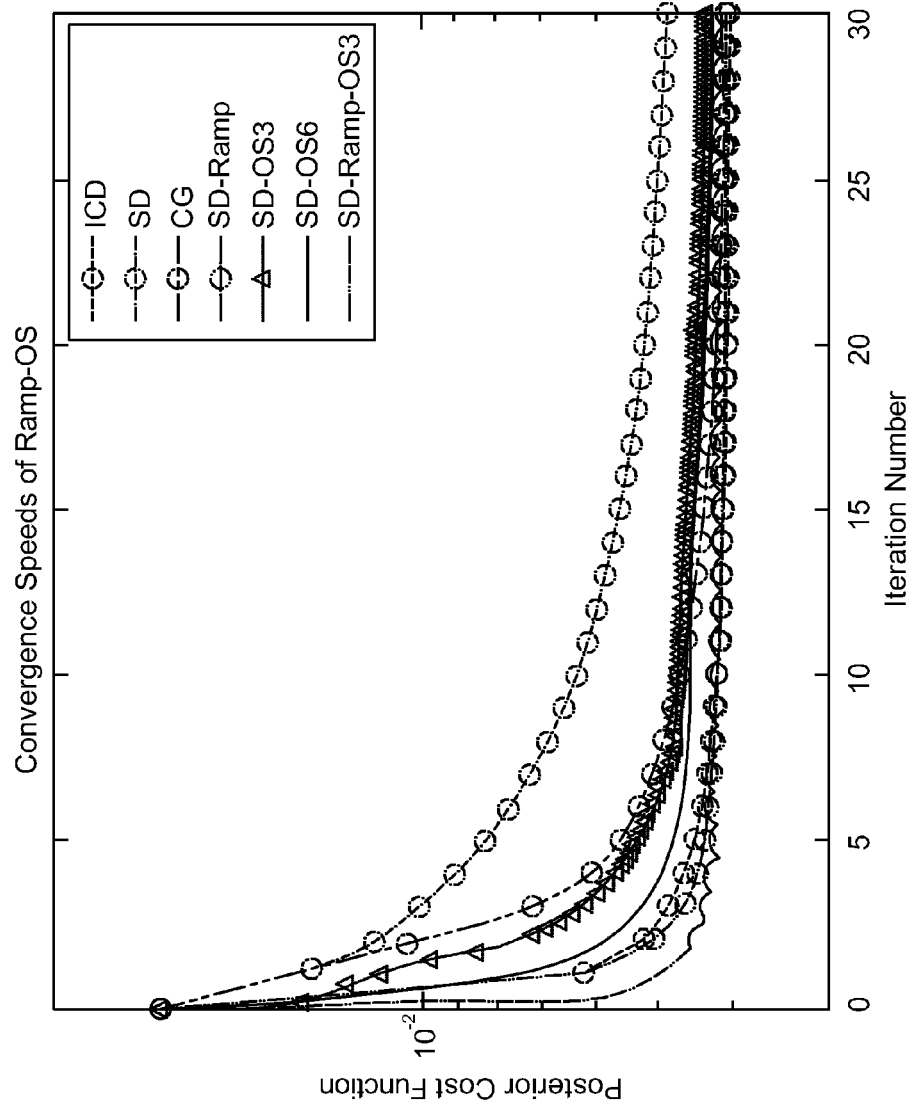
FIG. 5 depicts a graph displaying convergence speeds obtained using deconvolution filtering in conjunction with ordered sets during iterative reconstruction in accordance with aspects of the present disclosure.
Figure 6:
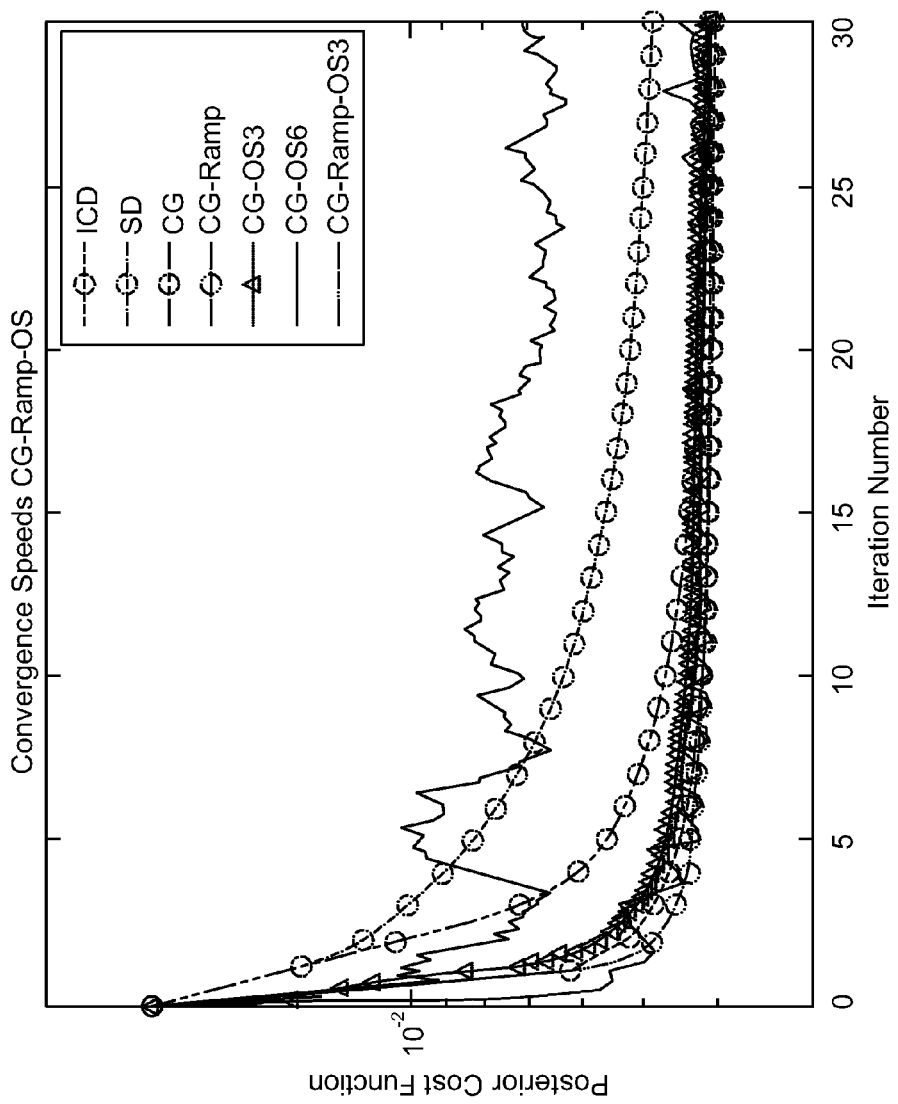
FIG. 6 depicts another graph displaying convergence speeds obtained using deconvolution filtering in conjunction with ordered sets during iterative reconstruction in accordance with aspects of the present disclosure

In a further example, ordered subsets (OS) may be used to further accelerate convergence in accordance with the presently disclosed approaches. In such an implementation, instead of using all projections simultaneously to compute an updated image estimate, a subset of projections can be used in each iteration. For instance, an OS version of equation (24) may be represented as $$x^{(n+1)} = x^{(n)} + \alpha FF^T[A_k^T f_k w_k(y_k - A_k x^{(n)}) - \beta\nabla R(x^{(n)})], k = n \mod K$$

where K is the total number of subsets, and $A_k$, $f_k$, $w_k$, and $y_k$, represent the subset k of A, f, w, and y, respectively. Turning to FIGS. 5 and 6, respective graphs are depicted demonstrating the convergence speeds of iterative coordinate descent (ICD), steepest descent (SD), conjugate gradient (CG) reconstructions as well as SD and CG implementations employing ramp-filter approximation of the Hessian matrix, ordered subsets, or both ramp filtering and ordered subsets. In the depicted examples, it can be observed that ramp filtering and ramp filtering with ordered subsets yield superior convergence speeds relative to other reconstruction approaches in both cases.

Technical effects of the invention include iterative reconstruction of tomographic images by applying a deconvolution filter in the image domain or, in other embodiments, in a non-image domain. One technical effect of the invention it to allow iterative reconstruction of a tomographic image by approximating the inversion of the Hessian matrix using a deconvolution filter. Another technical effect of the invention is the iterative reconstruction not of a desired image directly, but instead iteratively reconstructing an image which when deconvolution filtered (e.g., ramp filtered) yields the desired image.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A statistical iterative image reconstruction method for use in computed tomography (CT), the method comprising:
    generating an image;
    generating a set of calculated measurements based on the image;
    generating a set of actual measurements derived from a set of CT image data;
    comparing a measured sinogram derived from the set of actual measurements and a calculated sinogram derived from the set of calculated measurements to determine whether a completion criterion is satisfied;
    if the completion criterion is satisfied, providing the image as a final image;
    if the completion criterion is not satisfied, generating an image update of the image, applying a ramp filter or a square root of the ramp filter to one or both of the image or the image update, and repeating the steps of generating the set of calculated measurements and determining whether the completion criterion is satisfied based on the image after application of the image update.

2. The method of claim 1 wherein the image is transformed to the final image upon application of the ramp filter.

3. The method of claim 1 wherein the ramp filter corresponds to one or more of an approximation to the ramp filter, an approximation to the inverse of the Hessian matrix of the imaging system, or a high pass filter.

4. The method of claim 1 wherein the ramp filter is applied in two separate steps within each iteration such that the square root of the ramp filter is applied at each separate step.

5. The method of claim 1 wherein generating the set of calculated measurements comprises applying a forward model to generate the calculated sinogram.

6. The method of claim 1 wherein generating the set of calculated measurements comprises processing the image based on a measure of system optics to generate the set of calculated measurements.

7. The method of claim 1 wherein a noise model or statistical weighting is included.

8. The method of claim 1 wherein final image comprises a two-dimensional or a three-dimensional image.

9. The method of claim 1 wherein the ramp filter is two-dimensional, a three-dimensional extension of a two dimensional filter, or inherently three-dimensional.

10. The method of claim 1 wherein the ramp filter or the square root of the ramp filter are applied in one or both of the image domain or the projection domain.

11. The method of claim 1 wherein the ramp filter or the square root of the ramp filter are applied with or without an image prior.

12. The method of claim 1 wherein the ramp filter or the square root of the ramp filter is applied to a limited portion of the image data or a limited portion of the projection data.

13. The method of claim 1 wherein the ramp filter or the square root of the ramp filter is applied to ordered subsets of the image or projection data, or comprises employing an ordered subsets iterative reconstruction algorithm.

14. A statistical iterative reconstruction method for use in computed tomography (CT), the method comprising:
    iteratively reconstructing a first image using a statistical iterative reconstruction algorithm, wherein the first image, when filtered using a ramp filter, corresponds to a current estimate of a second image that represents an object scanned by a CT imaging system; and
    applying the ramp filter during each iteration of the iterative reconstruction.

15. The iterative reconstruction method of claim 14 wherein the iterative reconstruction simultaneously updates all pixels or voxels of the substituted image each iteration.

16. The iterative reconstruction method of claim 14 wherein the ramp filter is applied in the image domain or the projection domain.

17. The iterative reconstruction method of claim 14 wherein applying the ramp filter is accomplished by applying a square root of the ramp filter in two separate steps within each iteration.

18. The iterative reconstruction method of claim 14 wherein the ramp filter is implemented using fast Fourier transformation operations.

19. One or more non-transitory computer readable media, comprising one or more encoded routines that, when executed by a processor, perform acts comprising:
    iteratively reconstructing a sequence of images using a statistical iterative reconstruction algorithm, wherein a ramp filter is applied during each iteration of the statistical iterative reconstruction, wherein application of the ramp filter is accomplished by applying a square root of the ramp filter at two different steps within each iteration; and
    terminating the statistical iterative reconstruction upon satisfaction of a completion criterion.

20. The one or more non-transitory computer readable media of claim 19 wherein the statistical iterative reconstruction algorithm is applied to a set of tomographic image data generated by a computed tomography (CT) system.

21. The method of claim 1, wherein the ramp filter approximates an inverted Hessian matrix.

* * * * *